United States Patent [19]

Camiade et al.

[11] Patent Number: 5,173,705
[45] Date of Patent: Dec. 22, 1992

[54] TELECOMMUNICATIONS DEVICE USING ELECTROMAGNETIC WAVES

[75] Inventors: Marc Camiade, Antony; Véronique Serru, Paris; Dominique Geffroy, Courcouronnes, all of France

[73] Assignee: Thomson Composants Microondes, Puteaux, France

[21] Appl. No.: 792,924

[22] Filed: Nov. 15, 1991

[30] Foreign Application Priority Data

Nov. 16, 1990 [FR] France .................. 90 14290

[51] Int. Cl.⁵ .............................................. G01S 13/80
[52] U.S. Cl. ........................................ 342/42; 342/44; 342/51
[58] Field of Search ................ 342/44, 42, 51, 50

[56] References Cited

U.S. PATENT DOCUMENTS

| | | | |
|---|---|---|---|
| 3,728,630 | 4/1973 | Strenglein | 342/187 |
| 3,967,202 | 6/1976 | Batz | 342/42 |
| 4,053,854 | 10/1977 | Havens | 342/175 X |
| 4,075,632 | 2/1978 | Baldwin et al. | 342/51 |
| 4,114,151 | 9/1978 | Denne et al. | 342/44 |
| 4,121,102 | 10/1978 | Wilson | 342/44 X |
| 4,160,971 | 7/1979 | Jones et al. | 342/50 X |
| 4,213,129 | 7/1980 | Kennedy et al. | 342/51 |
| 4,242,663 | 12/1980 | Slobodin | 342/44 X |
| 4,296,414 | 10/1981 | Beyer et al. | 342/37 |
| 4,303,904 | 12/1981 | Chasek | 342/44 X |
| 4,345,253 | 8/1982 | Hoover | 342/44 |
| 4,654,658 | 3/1987 | Walton | 342/44 X |
| 4,656,472 | 4/1987 | Walton | 342/44 X |

FOREIGN PATENT DOCUMENTS 0324564 7/1989 European Pat. Off. .
2474204 7/1981 France .

OTHER PUBLICATIONS

Patent Abstracts of Japan, vol. 14, No. 288 (E-943)[4231], Jun. 21, 1990, & JP-A-2-90746, Mar. 30, 1990, I. Takano, "Digital Transmitter".

*Primary Examiner*—John B. Sotomayor
*Attorney, Agent, or Firm*—Oblon, Spivak, McClelland, Maier & Neustadt

[57] ABSTRACT

The disclosure relates to the field of data exchange by microwaves between a fixed station, or reader, and a mobile station, or badge. To achieve economy in the energy consumption of the badge, which has a "chip card" format, its input circuit or modem connected to the antenna does not transmit the modulated signal towards the reader. It reflects, in varying degrees, the carrier transmitted by the reader. The modulation of the reflection coefficient of the antenna is obtained by variation of the gate-source junction capacitance, which it itself related to the variation of the gate-source bias voltage of the input transistor of the modem. Application to remote-control toll-gates, remote money transactions and security checks.

4 Claims, 2 Drawing Sheets

TELECOMMUNICATIONS DEVICE USING ELECTROMAGNETIC WAVES

BACKGROUND OF THE INVENTION

1. Field of the Invention

The present invention relates to a system of transmission by modulation-demodulation of a microwave, for two-way communication between a fixed station, called a beacon or reader, and a mobile station, called a badge or responder. More precisely, the invention relates to the modem (modulator-demodulator) of the portable badge, the antenna impedance of which is matched or mismatched depending on whether the modem works, respectively, as a detector or as a responder to the signals transmitted by the fixed station. The impedance matching variations are obtained by causing variations in the biasing voltages of a transistor of the modem.

This type of data exchange can be applied to the control of moving bodies, for example in the identification of wagons on a railroad, automobiles at a toll-gate or pedestrians at the entrance to a building. The mobile station or badge takes the form of a chip card, and it has to be extremely economical in energy for it is supplied by small cells known as "buttons".

2. Description of the Prior Art

The general diagram of a system for the exchange of data by microwave electromagnetic radiation, according to the prior art, is fairly simple and FIG. 1 which represents it enables its elements and the abbreviations used to be specified.

A mobile station or badge 1 includes a microwave modem part 3, an information processing part 4 and a supply 5. The exchanges between these two parts relate to the operation of modulation/demodulation and to the transmission/reception commands.

The fixed station or beacon 2 includes a microwave source, a microwave modem part 6, an information processing part 7 and a computer 8 which enables the management of all the radioelectrical exchanges carried out with the badges, by means of an antenna 9 for each badge and an antenna 10 for each beacon or reader.

The following values will be used:
d = distance between the antennas 9 and 10,
$G_l$ = gain of the antenna 10 of the reader 2
$G_b$ = gain of the antenna 9 of the badge 1
$P_{li}$ = power transmitted at the antenna of the reader 2
$P_{lr}$ = power received by the antenna of the reader
$P_{bi}$ = power transmitted at the antenna of the batch 1
$P_{br}$ = power received by the antenna of the batch The modulations used in these systems are generally of the OOK (on-off keying) type in amplitude modulation or of the PSK (phase-shift keying) type in phase modulation or of the FSK (frequency shift keying) type in frequency modulation.

The working of the modem differs, depending on whether the beacon interrogates the badge or whether the badge responds to the beacon.

In the mode in which the badge 1 is interrogated by the reader 2, the reader 2 generates ($P_{li}$) a modulated microwave signal. The badge receives this signal ($P_{br}$) and demodulates it: it is a step that enables the activation of the badge that has been in the vigil state.

In the mode in which the badge 1 is responding to the reader 2, the reader generates a non-modulated microwave signal. The badge receives this signal, modulates it, i.e. loads it with the information on which it has been interrogated and re-transmits a signal comprising, as the case may be, either losses or gain.

The electrical circuits used to perform the microwave function (modem) of the badge may be of different types.

The active circuits comprise the specific feature of giving power at the microwave frequencies of the carrier (of the order of 1 to 100 GHz). They therefore have gain at these frequencies, and use a biased transistor. These circuits are generally used during the retransmission of a signal from the badge towards the reader.

The semi-active circuits give no power at the microwave frequencies of the carrier, for which they have no gain, but nevertheless have gain at the demodulation frequencies of the order of 40 kHz to 1 MHz, or several MHz, but not in GHz. These circuits are valuable for increasing the detection sensitivity of the badge.

There also exist passive circuits, using diodes, switches etc... which have no gain, either at the microwave frequencies of the carrier (>1 GHz) or at the demodulation frequencies (<1 GHz). These circuits have low sensitivity to control the information processing circuit 4, at least in the case of a portable badge, since there is a problem of energy provided by the small "button" cells: these circuits therefore perform less well in detection.

The condition necessary for the transmission from the reader to the badge to be operational is:

$$P_{br} = P_{li} \cdot G_1 \cdot G_b \left(\frac{\lambda}{4\,d}\right)^2 > P_{br\,min}$$

with
$\lambda$ = wavelength of the carrier wave.
$P_{br\,min}$ = minimum power of triggering of the modem of the badge in the demodulation mode.

As a rule, there are no power problems for the reader, since it is a fixed station that can have all the requisite energy available to it.

The condition necessary for the transmission from the badge to the reader (i.e. the response) to be operational is:

$$P_{lr} = P_{li} \cdot G_1^2 \cdot G_b^2 \left(\frac{\lambda}{4\,d}\right)^4 \cdot G_{mod} > P_{lr\,min}$$

with
$G_{mod}$ = loss or gain provided by the modem of the badge during the modulation of the carrier transmitted by the reader.
$P_{lr\,min}$ = minimum power of triggering of the demodulation chain of the reader.

It has been stated that the badge has only low energy sources, and that it is appropriate to economize energy by low consumption.

SUMMARY OF THE INVENTION

According to the invention, the major part of the power $P_{bi}$ transmitted by the badge (or more precisely retransmitted by the badge) comes from the power $P_{li}$ transmitted by the reader, plus or minus the gains of antennas 9 and 10.

Indeed, the basis of the invention lies in a badge modem circuit that behaves like a semi-active demodulation circuit during the interrogation of the badge by the reader and as an echo modulation passive circuit during the response of the badge to the reader. The circuit according to the invention is therefore semi-active in reception and passive in retransmission.

This result is obtained by modifying the characteristic impedance, or matching, of the antenna of the modem of the badge. The antenna is matched in reception, and has high detection sensitivity and controls the processing circuit of the signal of the badge which, in its turn, sends the antenna mismatching signals for retransmission. Furthermore, the antenna is mismatched in transmission, and reflects the microwave carrier transmitted by the reader with, however, a modulation of the reflection coefficient, which means that the wave retransmitted as an echo is modulated by the badge.

This modulation, namely the antenna matching variation, is acquired at the cost of low energy consumption for it is achieved by a variation of the bias voltages of a transistor.

More precisely, the invention consists of a telecommunications device using electromagnetic waves, for the exchange of data between a fixed station, called a reader, and a mobile station, called a badge, which includes at least one modem circuit, or demodulator-modulator, connected to a transmission/reception antenna wherein, in the badge-to-reader direction, the badge modulates the carrier wave emitted by the reader by modulation of the reflexion coefficient of its antenna, obtained by the mismatching of the impedance of the antenna.

BRIEF DESCRIPTION OF THE DRAWINGS

The invention will be understood more clearly from the following more detailed description of the working of the modem of the badge, based on two exemplary embodiments, and on the appended figures, of which.

MORE DETAILED DESCRIPTION

In the data exchange system using electromagnetic waves according to the invention, the badge (namely the part which is most difficult to make because of the energy source) comprises a single microwave source 3 which behaves differently depending on whether it is being interrogated or whether it is responding.

In the reader 2/badge 1 direction (interrogation by the reader), the reader sends an amplitude modulated microwave and the function of detecting the level of the badge is carried out by a non-linear component which is a transistor. The modem 3, which works at this time as a demodulator, restores the envelope of the signal transmitted by the reader, amplifies it if necessary and sends it to the information processing circuit 4.

Figure 2:
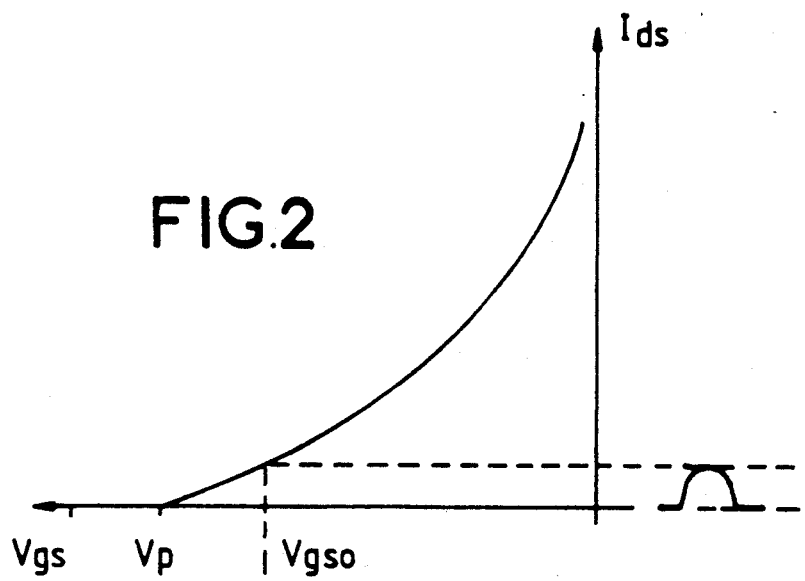
FIG. 2 shows a curve I(V) of a transistor as used in a detector in the invention.

FIG. 2 shows the curve of $I_{ds}$ as a function of $V_{gs}$ for a field-effect transistor. If this transistor is biased at its gate at a voltage $V_{gs0}$ close to its pinch-off voltage, this bias point, at a very low current of some microamperes, is useful because the transistor works as an amplitude detector at the frequency (of the order of 1 to 100 Ghz) of the carrier and moreover with high sensitivity. The non-linearity of the current $I_{ds}$ as a function of the voltage $V_{gs}$ explains this detection phenomenon. But, in addition, the field-effect transistor is an active component that shows a gain, at the demodulation frequencies, of the order of 50 kHz to 1 mHz which are low frequencies as compared to those of the carrier (1 to 100 GHz). It is even possible to add on an amplifier to the level detector, but the sensitivity obtained by means of a single transistor is of the order of 60 mV/$\mu$W at 10 GHz, for a current of 3 to 5 $\mu$A.

In the badge 1/reader 2 direction, i.e. the direction of response by the badge, it is still the reader that sends a non-modulated microwave or carrier, and the badge responds by modulating this carrier, reflected towards the reader. The modem 3 works at this time as a modulator, and the function of modulation of the carrier by the badge is fulfilled by the variation of the matching of the antenna 9. Naturally, the signals that match or mismatch the antenna 9 are sent out by the information processing circuit 4 which is activated by the preceding interrogation phase.

The carrier is modulated in amplitude by an OOK (On-Off Keying) type amplitude i.e. between two logic states. To simplify the language used, a first logic state shall be called the "low" state and a second logic state shall be called the "high" state. However, the operation of the circuit would remain the same if the "high" and "low" states were to be mutually reversed.

The "low" logic state of the carrier modulation is obtained by matching the antenna in impedance, i.e. the power that it reflects towards the reader is null: $P_{bi} \approx 0$. The "high" logic state is obtained by highly mismatching the antenna so that it reflects the maximum power of the carrier: $P_{bi} \approx P_{br}$, plus or minus the losses.

The "low" logic state in which the antenna does not reflect the carrier is obtained by choosing, as the gate bias voltage $V_{gs}$, the voltage $V_{gs0}$ for which the transistor works as a demodulator. The transistor has nothing to demodulate, but the antenna is matched in impedance and the reflected power is null.

Figure 3:
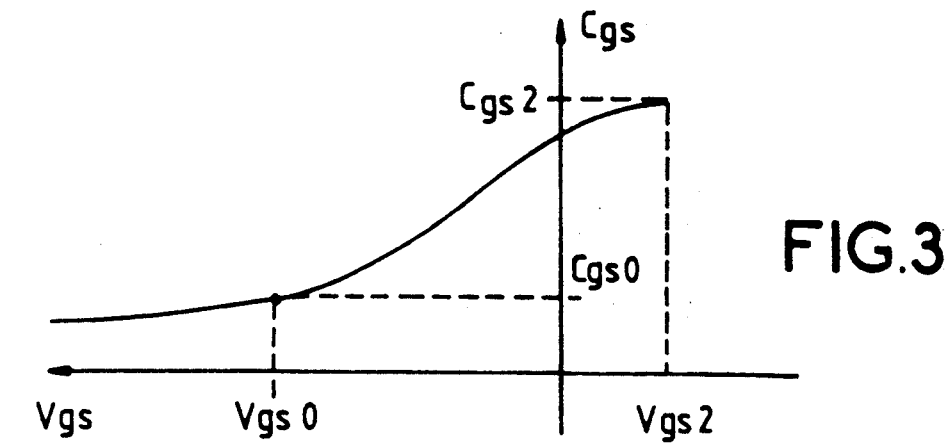
FIG. 3 shows a curve C(V) of a transistor as used in a modulator in the invention.

To this first bias voltage $V_{gs0}$, there corresponds a first gate-source capacitance $C_{gs0}$ which is low, as can be seen in the curve of FIG. 3, which shows the variation in gate-source capacitance $C_{gs}$ as a function of the variation in the gate-source bias $V_{gs}$.

The "high" logic state in which the impedance mismatched antenna reflects the carrier is obtained by modifying the gate-source voltage $V_{gs}$ of the transistor. The variation of the gate-source junction capacitance as a function of the gate-source bias voltage is used to mismatch the antenna, and the "high" logic state is obtained by biasing the gate-source junction forwardly, at $V_{gs2}$, which corresponds, according to FIG. 3, to a high equivalent capacitance $C_{gs2}$. The antenna is highly mismatched in impedance, and reflects all the incident power (except for the losses). As a non-restrictive example $V_{bs0} = -1$ V and $V_{gs2} = +0.6$ V.

Figure 1:
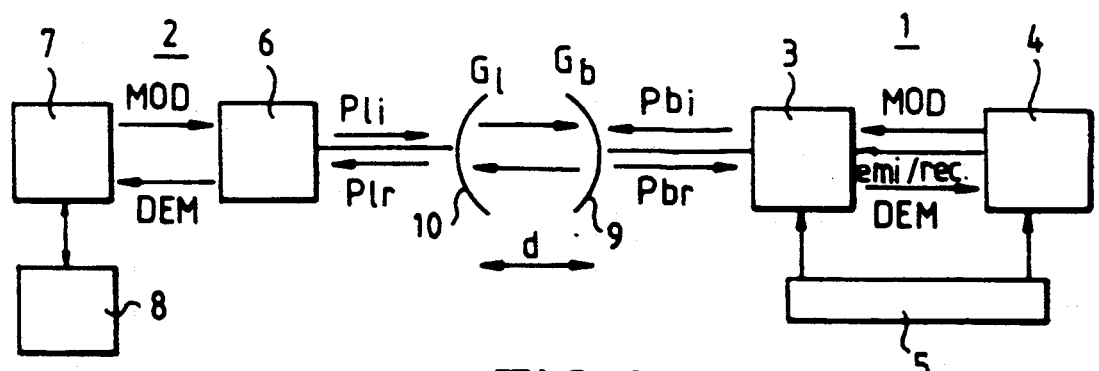
FIG. 1 shows a simplified general diagram of a data exchange system as described above.
Figure 4:
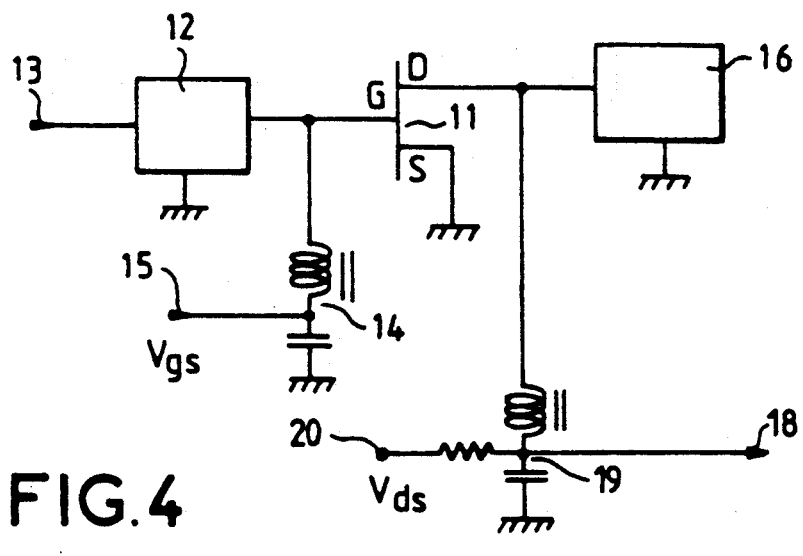
FIG. 4 shows a simplified diagram of the detector circuit according to the invention.

FIG. 4 shows a simplified electrical diagram of the modem circuit 3 according to the invention. It has at least one field-effect transistor 11. Naturally, the modem may include other transistors, but ones that carry out different functions such as load, amplification, switching and other functions. A matching network 12 is connected between the gate of the transistor and the microwave input 13, which is the antenna 9 of FIG. 1. This matching network 12 takes account of the source impedance, equivalent to a ground connection. A filter at 14 filters the bias voltages $V_{gs}$, at the terminal 15, which make the circuit go from the demodulator state to the modulator state. A microwave load 16 and a low-pass filter 19 are placed on the drain of the transistor, the low-pass filter 19 delivering an amplitude demodulation output signal at 18.

Figure 5:
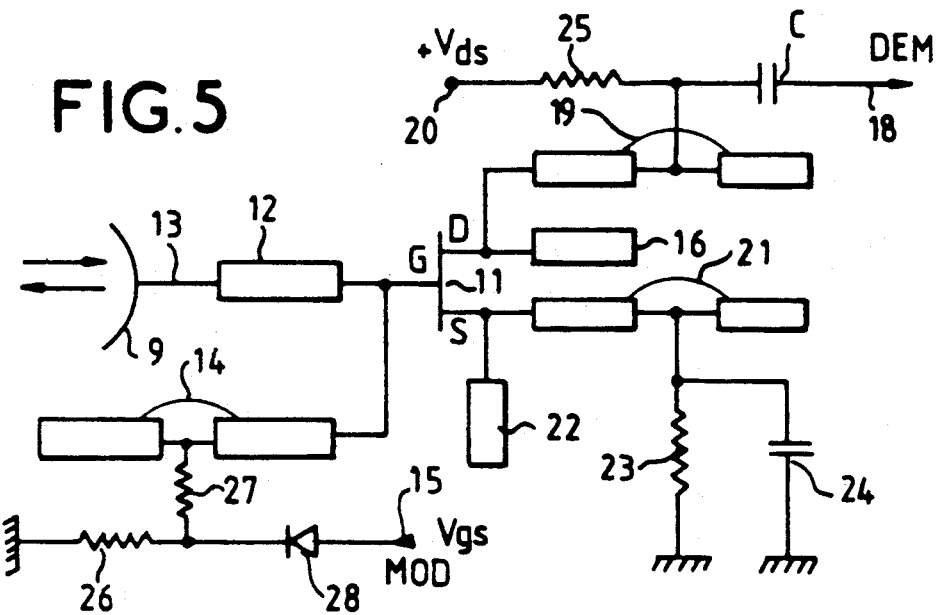
FIG. 5 shows a diagram of the microwave badge circuit according to the invention, in a hybrid embodiment.
Figure 6:
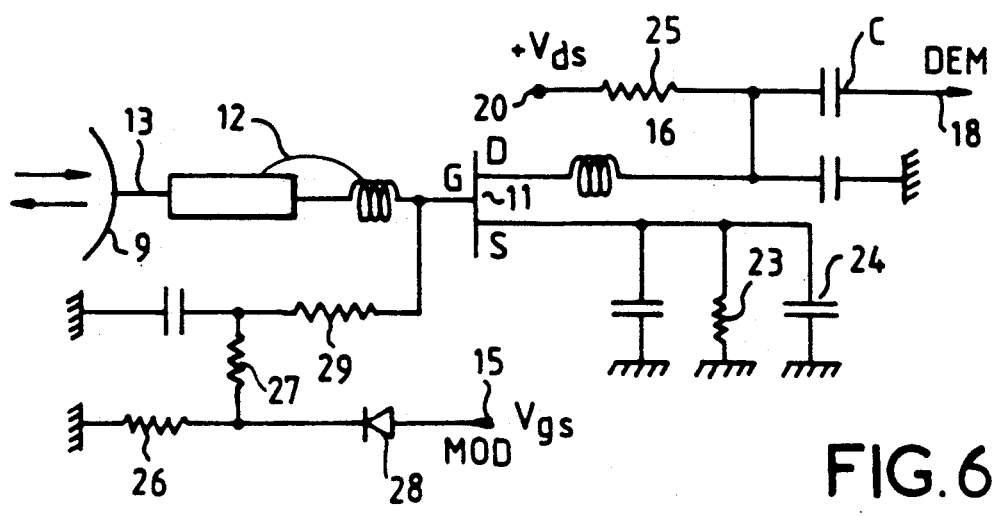
FIG. 6 shows a diagram of the same circuit, in an integrated circuit embodiment.

Of the next two figures, FIG. 5 shows a drawing of embodiments of the modem 3 of the badge in the form of discrete components using hybrid technology, and FIG. 6 shows this modem 3 in the form of a monolithic integrated circuit.

The circuit of FIG. 5 is therefore made on an insulator substrate to which there are attached discrete components such as a transistor, diode, resistors in the form of pads, or on which there are deposited microstrip lines which are too bulky for a circuit such as this to be integrated.

The same reference indices as in FIG. 4 are used to identify the components or functions. It may be specified, however, that:

the lines 14, 19 and 21 are of the quarter-wave type and are used to decouple the bias supplies.

the line 22 is of the quarter-wave type and enables the source of the transistor 11 to be grounded, at the carrier frequency, there is a self-biasing resistor 23 at the source of the transistor: this method provides for high insensitivity of the drain-source bias current $I_{ds}$ to the pinch-off voltage $V_p$ of the transistor, the capacitor 24, in parallel on the resistor 23, enables the source to be grounded at the modulation and demodulation frequencies, on the drain, the biasing resistor 25 has a high value, of the order of 100 kΩ, which gives high detection sensitivity, optimized by the line 16, on the gate, the resistors 26 and 27 and the diode 28 enable the biasing of the gate in a modulated manner, by means of a voltage $\pm V$ applied to the terminal 15. If V is positive, the gate is biased positively through the limiting resistor 27 (during the operation of the circuit in modulating mode). If V is negative, the gate is at 0 V since no current flows through, but the source is self-biased by the resistor 23 at $V_{gs0} \approx -1$ V.

This microwave circuit further has an output terminal 18 decoupled by a capacitor C: the signals detected during the demodulation are sent to the processing circuit 4 (FIG. 1) which responds by sending modulated signals to the terminal 15. These modulated signals match or mismatch the antenna impedance, thus modulating the carrier reflected towards the reader 2.

The drawback of this hybrid circuit is that it has to be attached to a rigid substrate and joined to integrated circuits chips for information processing, such as microprocessor chips or memories.

The integrated circuit, the diagram of which is given in FIG. 6, has the advantage of being only a part of a more complex integrated circuit comprising control circuits. This makes the badge monolithic, with the exception of some components which are too bulky to be capable of being integrated: these are the matching microstrip line 12 and the RC networks 23+24 and 25+C.

In this circuit, the gate and drain impedance matching networks are inductors which can be integrated, although the gate requires a microstrip line all the same.

The resistor 29 on the gate bias enables the widening of the band of operating frequencies.

The capacitors without references are microwave decoupling capacitors.

The equivalence of the functions, shown by the same references in FIGS. 5 and 6, is clear to those skilled in the art who will recognize therein the two forms of one and the same microwave badge modem.

What is claimed is:

1. A telecommunication device using electromagnetic waves, for exchanging data between a fixed reader station and a mobile badge station, said fixed reader station comprising:

generating means for generating electromagnetic signals, including an interrogation electromagnetic signal;

a first antenna for transmitting and receiving the electromagnetic signals, including transmitting the interrogation signal; said mobile badge station comprising:

a second antenna for transmitting electromagnetic signals and receiving electromagnetic signals transmitted from the fixed reader station, including receiving the interrogation signal;

a modulator/demodulator circuit for delivering signals to the second antenna and receiving signals from the second antenna, comprising at least one transistor, with a gate source junction capacitance, which can be in a first state and a second state, wherein when said transistor is in the first state an impedance of the second antenna is matched to receive electromagnetic signals transmitted from the fixed reader station at the second antenna, and when said transistor is in the second state an impedance of the second antenna is mismatched to reflect signals received at the second antenna back to the first antenna of the fixed reader station; and an information processing circuit for receiving said interrogation signal from said modulator/demodulator circuit and controlling switching of the transistor from the first state to the second state upon receiving the interrogation signal.

2. The device according to claim 1, wherein the transistor is connected to the second antenna by its gate through a matching network.

3. The device according to claim 2, wherein a variation in the source junction capacitance $C_{gs}$ of the second antenna is obtained by a variation of a bias voltage $V_{gs}$ of said transistor.

4. The device according to claim 1, wherein the mobile badge station and fixed reader station communicate by microwaves, in a 1 to 100 GHz band.

* * * * *